US012719282B2

(12) United States Patent
Kokubo et al.

(10) Patent No.: US 12,719,282 B2
(45) Date of Patent: Aug. 25, 2026

(54) POWER CONTROL SYSTEM INCLUDING POWER SUPPLY DC LINE AND SELECTED ONE OF PLURAL PERFORMING DC VOLTAGE FEEDBACK CONTROL

(71) Applicant: MUSASHI SEIMITSU INDUSTRY CO., LTD., Toyohashi (JP)

(72) Inventors: Toshinori Kokubo, Toyohashi (JP); Tomohisa Sukigara, Toyohashi (JP); Kazuhiro Enokishima, Toyohashi (JP)

(73) Assignee: Musashi Seimitsu Industry Co., Ltd., Aichi (JP)

(*) Notice: Subject to any disclaimer, the term of this patent is extended or adjusted under 35 U.S.C. 154(b) by 0 days.

(21) Appl. No.: 18/833,993

(22) PCT Filed: Mar. 7, 2022

(86) PCT No.: PCT/JP2022/009720
§ 371 (c)(1),
(2) Date: Jul. 29, 2024

(87) PCT Pub. No.: WO2023/170742
PCT Pub. Date: Sep. 14, 2023

(65) Prior Publication Data
US 2025/0125622 A1 Apr. 17, 2025

(51) Int. Cl.
*H02J 3/32* (2026.01)
*H02J 3/38* (2006.01)
(Continued)

(52) U.S. Cl.
CPC ................ *H02J 3/32* (2013.01); *H02J 3/381* (2013.01); *H02J 3/388* (2020.01); *H02J 7/34* (2013.01);
(Continued)

(58) Field of Classification Search
CPC ...... H02J 3/32–322; H02J 3/381; H02J 3/388; H02J 2300/20–28; H02J 7/34; H02J 7/345; H02J 7/35
See application file for complete search history.

(56) References Cited

U.S. PATENT DOCUMENTS

2017/0093187 A1* 3/2017 Park ........................ H02J 3/381
2017/0187189 A1* 6/2017 Abido ...................... H02J 3/28
(Continued)

FOREIGN PATENT DOCUMENTS

CN 106849156 A * 6/2017 ................ H02J 3/32
CN 109309389 A * 2/2019 ............. H02J 3/383
(Continued)

OTHER PUBLICATIONS

English machine translation of CN106849156A published Jun. 13, 2017 (Year: 2017).*

(Continued)

*Primary Examiner* — Rexford N Barnie
*Assistant Examiner* — David A Shiao
(74) *Attorney, Agent, or Firm* — Carrier, Shende & Associates P.C.; Joseph P. Carrier; Jeffrey T. Gedeon

(57) ABSTRACT

A power control system capable of controlling a plurality of proportional charge/discharge controllers while suppressing the occurrence of mutual interference in voltage feedback control. The power control system is connected to a power supply line to which a plurality of proportional charge/discharge controllers and a load are connected. Each of the proportional charge/discharge controllers are connected to respective power supply sources including at least one or more power generation devices including renewable energy-utilizing power generation devices and commercial power sources. A capacitor is electrically connected to the power supply line so that the DC-converted potential difference (Continued)

with the load does not fluctuate. The system further includes a control unit that controls the plurality of proportional charge/discharge controllers and performs voltage feedback control to bring the voltage of the power supply line closer to a target voltage for only one specific controller of the plurality of proportional charge/discharge controllers.

9 Claims, 6 Drawing Sheets

(51) Int. Cl.
*H02J 3/388* (2026.01)
*H02J 7/34* (2006.01)
*H02J 7/35* (2006.01)
*H02J 101/24* (2026.01)

(52) U.S. Cl.
CPC ................ *H02J 7/345* (2013.01); *H02J 7/35* (2013.01); *H02J 2101/24* (2026.01)

(56) References Cited

U.S. PATENT DOCUMENTS

2017/0236648 A1* 8/2017 Lazarev .................. H01G 4/18 320/166
2017/0288403 A1* 10/2017 Lung ......................... H02J 3/38
2022/0200287 A1 6/2022 Endo et al.
2024/0014682 A1* 1/2024 Lu ............................ H02J 7/35

FOREIGN PATENT DOCUMENTS

CN 110970943 A * 4/2020 ................ H02J 5/00
JP H09-135571 A 5/1997
JP 2002-034162 A 1/2002
JP 2010-057342 A 3/2010
JP 2012-228023 A 11/2012
JP 2015-192533 A 11/2015
JP 2021-197823 A 12/2021
WO 2018/061400 A1 4/2018
WO 2020/218191 A1 10/2020
WO 2021/090371 A1 5/2021

OTHER PUBLICATIONS

English machine translation of CN109309389A published Feb. 5, 2019 (Year: 2019).*
English machine translation of CN110970943A published Apr. 7, 2020 (Year: 2020).*
H. Kakigano, Y. Miura and T. Ise, “Distribution Voltage Control for DC Microgrids Using Fuzzy Control and Gain-Scheduling Technique,” Sep. 7, 2012, in IEEE Transactions on Power Electronics, vol. 28, No. 5, pp. 2246-2258, May 2013. (Year: 2012).*
Office Action (Notice of Reasons For Refusal), dated Aug. 5, 2025, issued in the corresponding Japanese Patent Application No. 2024-505666 with the English machine translation thereof.
Examination report dated Jun. 11, 2026, issued in the counterpart Indian Patent Application No. 202417062731.
Yan Bao et al., “Adaptive Feedforward Compensation for Voltage Source Disturbance Rejection in DC-DC Converters”, IEEE Transactions On Control Systems Technology, 2017.

* cited by examiner

20
SOLAR PANEL
12
10
14
14A
V
A
14B
DC/DC CONVERTER
22
AC/DC CONVERTER
Wa
Wp
130
Ws
DC/DC CONVERTER
132
52
50
140
110
Wc
112
LW
150
100
Wr
30
LOAD
120
PCU
121
CONTROL UNIT
124
POWER DETERMINATION UNIT
125
POWER DISTRIBUTION UNIT
122
MEMORY UNIT
123
I/F UNIT
40
MASTER CONTROLLER

FIG.2

| PRESENCE OR ABSENCE OF SURPLUS POWER | LIB CHARGE/DISCHARGE POSSIBILITY | ISOLATED OPERATION MODE | SURPLUS POWER UTILIZING MODE |
|---|---|---|---|
| $W_p \geqq W_r$ | YES | $W_p \rightarrow W_r, W_s$ | $W_p \rightarrow W_r, W_s$ |
| | NO | (SUPPRESS POWER GENERATION) | $W_p \rightarrow W_r$, REVERSE POWER FLOW |
| $W_p < W_r$ | YES | $W_p, W_s \rightarrow W_r$ | $W_p, W_s \rightarrow W_r$ |
| | NO | (STOP SUPPLYING POWER) | $W_p, W_a \rightarrow W_r$ |

MASTER CONTROLLER
40
POWER GENERATION EQUIPMENT SENSOR
14A
LOAD SENSOR
150
CAPACITOR SENSOR
140
MS
Ws1
Wp1
Wr1
Wc1
120
POWER DETERMINATION UNIT
124
POWER DISTRIBUTION UNIT
125
ΔW
ΔWs, ΔWc
Wa1
Wp2
Ws2
AC/DC CONVERTER
22
DC/DC CONVERTER
14B
DC/DC CONVERTER
130
20
SOLAR PANEL
12
52
50

FIG.4

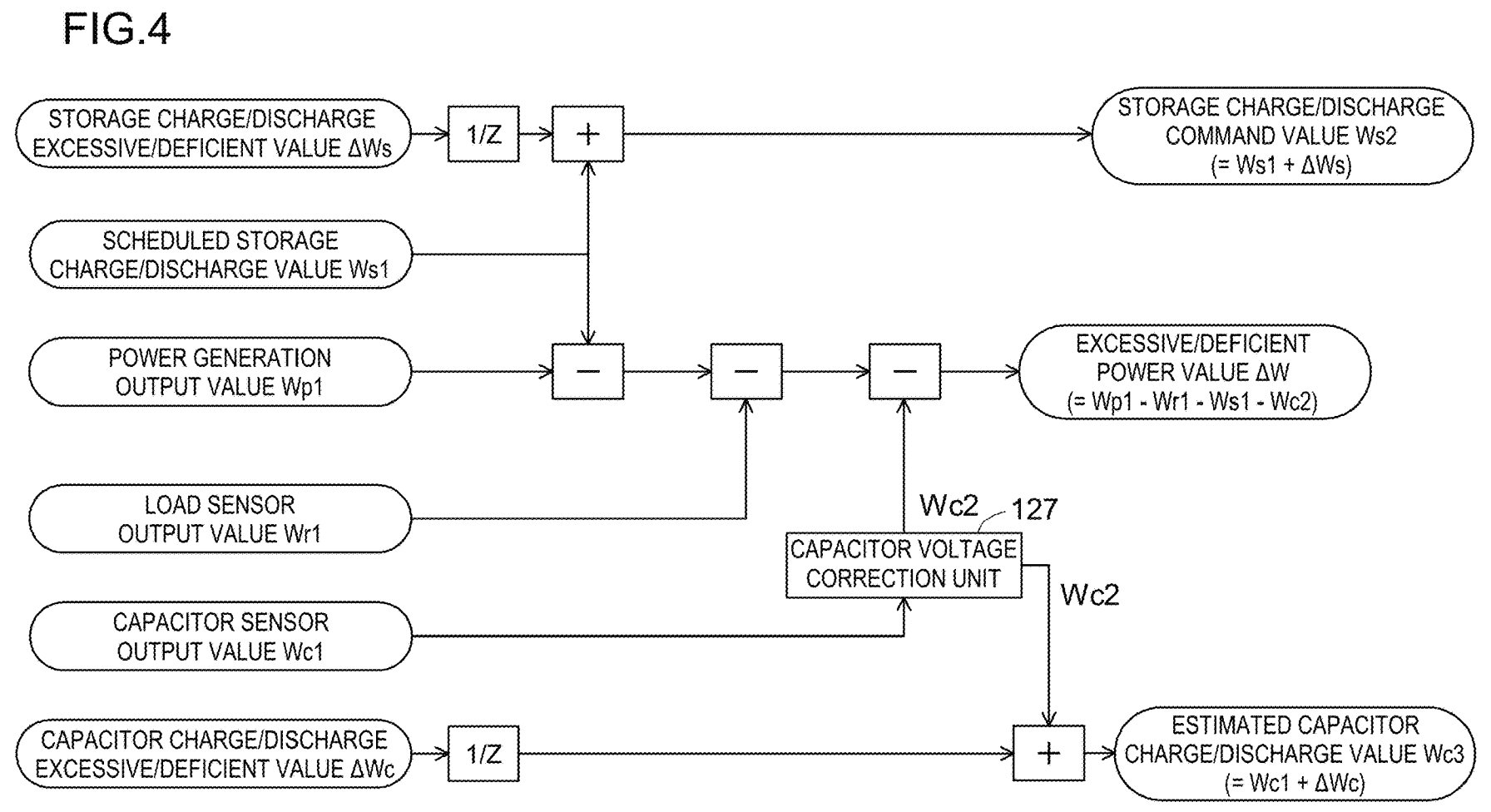

STORAGE CHARGE/DISCHARGE EXCESSIVE/DEFICIENT VALUE ΔWs

SCHEDULED STORAGE CHARGE/DISCHARGE VALUE Ws1

POWER GENERATION OUTPUT VALUE Wp1

LOAD SENSOR OUTPUT VALUE Wr1

CAPACITOR SENSOR OUTPUT VALUE Wc1

CAPACITOR CHARGE/DISCHARGE EXCESSIVE/DEFICIENT VALUE ΔWc

1/Z

+

−

−

−

1/Z

+

CAPACITOR VOLTAGE CORRECTION UNIT

127

Wc2

Wc2

STORAGE CHARGE/DISCHARGE COMMAND VALUE Ws2 (= Ws1 + ΔWs)

EXCESSIVE/DEFICIENT POWER VALUE ΔW (= Wp1 - Wr1 - Ws1 - Wc2)

ESTIMATED CAPACITOR CHARGE/DISCHARGE VALUE Wc3 (= Wc1 + ΔWc)

FIG.5

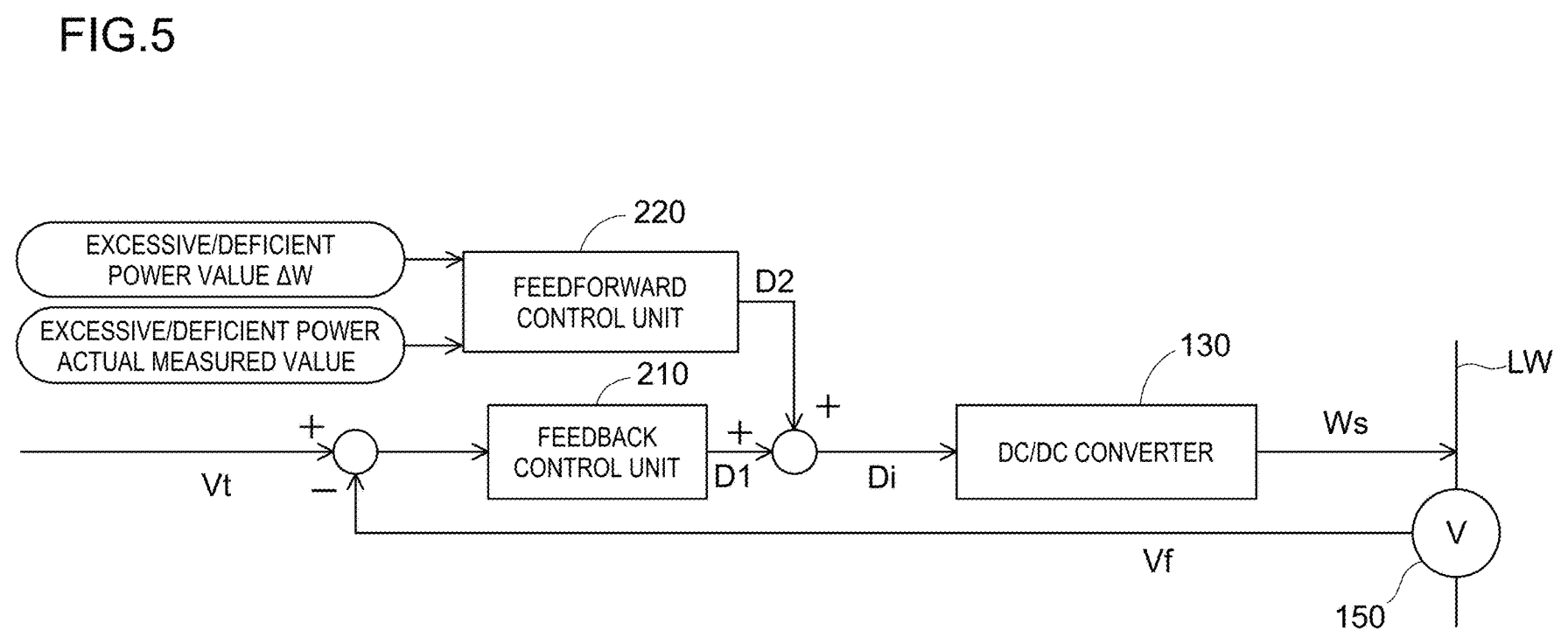

EXCESSIVE/DEFICIENT POWER VALUE ΔW
EXCESSIVE/DEFICIENT POWER ACTUAL MEASURED VALUE
220
FEEDFORWARD CONTROL UNIT
D2
210
FEEDBACK CONTROL UNIT
D1
+
+
Di
Vt
+
−
130
DC/DC CONVERTER
Ws
Vf
LW
V
150

POWER CONTROL SYSTEM INCLUDING POWER SUPPLY DC LINE AND SELECTED ONE OF PLURAL PERFORMING DC VOLTAGE FEEDBACK CONTROL

TECHNICAL FIELD

This invention relates to a power control system.

BACKGROUND ART

There is known a conventional power control system connected to a power supply DC line to which a plurality of proportional charge/discharge controllers and a load are connected (see Patent Documents 1 to 3 below). The plurality of proportional charge/discharge controllers are connected to each of a plurality of power supply sources. The plurality of power supply sources are, e.g., renewable energy-utilizing power generation devices and storage batteries. Capacitors or the like are directly connected to the power supply DC lines. The power control system has a control unit that controls the plurality of proportional charge/discharge controllers.

CITATION LIST

Patent Literature

Patent Document 1; JP 2015-192533 A
Patent Document 2: WO 2018/061400 A
Patent Document 3: JP 2002-34162 A

SUMMARY OF INVENTION

Technical Problem

Here, conventional power control systems do not consider a configuration in which a plurality of power supply sources connected to each of a plurality of proportional charge/discharge controllers include both power generation devices (e.g., renewable energy-utilizing power generation devices) and commercial power sources. Therefore, in such a configuration, there is room for improvement in the control of the plurality of proportional charge/discharge controllers, e.g., from the viewpoint of effective utilization of renewable energy.

An object of the present invention is to provide a power control system capable of solving the above-mentioned problems.

Solution to Problem (1) A power control system disclosed herein is a power control system connected to a power supply DC line to which a plurality of proportional charge/discharge controllers and a load are connected, each of the plurality of proportional charge/discharge controllers being connected to respective power supply sources that include at least one or more power generation devices including renewable energy-utilizing power generation devices and commercial power sources, the power control system including: a capacitor electrically connected to the power supply DC line so that the DC-converted potential difference with the load does not fluctuate; and a control unit that controls the plurality of proportional charge/discharge controllers and performs DC voltage feedback control to bring the voltage of the power supply DC line closer to a target voltage for only one specific controller of the plurality of proportional charge/discharge controllers.

In this power control system, a plurality of proportional charge/discharge controllers connected to each of the plurality of power supply sources are controlled by the control unit. The plurality of power supply sources includes a power generation device and a commercial power source. Here, if the control unit were to perform DC voltage feedback control for the plurality of proportional charge/discharge controllers individually, there would be a risk of mutual interference due to deviations in control timing and control quantity. If mutual interference in DC voltage feedback control occurs, for example, power generation by the power generator may stop due to unexpected fluctuations in the voltage of the power supply DC line, making it impossible to effectively utilize renewable energy.

With respect to this, the inventors, after careful consideration, have newly found a configuration in which a capacitor is connected to the power supply DC line so that the DC-converted potential difference with the load does not fluctuate, and DC voltage feedback control is performed for only one specific controller among the plurality of proportional charge/discharge controllers. This configuration makes it possible to control the plurality of proportional charge/discharge controllers while suppressing the occurrence of mutual interference in DC voltage feedback control. In other words, because the capacitors are connected to the power supply DC line in such a way that the DC-converted potential difference with the load does not fluctuate, the temporal change (response, amplitude) of the voltage on the power supply DC line is reduced according to the capacitor capacity. For example, the voltage of the power supply DC line fluctuates slowly in response to sudden changes in load voltage. Therefore, the effect of voltage fluctuations in the power supply DC line on the control of other proportional charge/discharge controllers can be suppressed despite the use of a configuration in which DC voltage feedback control is performed only for a specific controller.

(2) In the power control system described above, the control unit may be configured to combine the DC voltage feedback control with feedforward control based on a predicted excessive/deficient power consumption of the load relative to the power supplied from the plurality of power supply sources to control the specific controller. This power control system can control the plurality of proportional charge/discharge controllers while suppressing instantaneous fluctuations in the voltage of the power supply DC line due to disturbances in addition to the occurrence of mutual interference in the DC voltage feedback control.

(3) In the above power control system, the control unit may be configured to combine the DC voltage feedback control with gain scheduler control based on a predicted value of excessive/deficient power consumption of the load relative to the power supplied from the plurality of power supply sources to control the specific controller. This power control system can control the plurality of proportional charge/discharge controllers while suppressing instantaneous fluctuations in the voltage of the power supply DC lines due to disturbances in addition to the occurrence of mutual interference in the DC voltage feedback control.

(4) In the above power control system, the specific controller may be configured to be a proportional charge/discharge controller connected to a power supply source other than a power generation device (e.g., renewable energy-utilizing power generation devices). This power control system can control a plurality of proportional charge/ discharge controllers while suppressing the occurrence of mutual interference of control and effectively utilizing renewable energy, without being restricted by current (power) control of the power generation control of the power generation device.

(5) In the above power control system, the plurality of power supply sources may be configured to include an energy storage medium, and in a grid-disconnected condition where the commercial power source is disconnected from the power supply DC line, the specific controller may be a proportional charge/discharge controller connected to the energy storage medium. This power control system, which suppresses the power generation control of the power generation device from being restricted by the DC voltage feedback control, can control a plurality of proportional charge/discharge controllers while suppressing the occurrence of mutual interference of the DC voltage feedback control and effectively utilizing renewable energy.

(6) In the power control system described above, the system may be configured so that, in a grid-connected condition where the commercial power source is connected to the power supply DC line, the specific controller is a proportional charge/discharge controller connected to the commercial power source. This power control system, which suppresses the power generation control of the renewable energy-utilizing power generation device from being restricted by the DC voltage feedback control, can control a plurality of proportional charge/discharge controllers while suppressing the occurrence of mutual interference of the DC voltage feedback control and effectively utilizing renewable energy.

It should be noted that the invention can also be implemented in other forms, such as a power control system, a power control method, a power control program, and a non-temporary recording medium in/on which the power control program is recorded.

BRIEF DESCRIPTION OF DRAWINGS

FIG. 2 is an explanatory view illustrating charge/discharge relationships when "isolated operation mode" and "surplus power utilizing mode" are performed.

FIG. 4 is an explanatory view illustrating a flow of processes executed by a power determination unit 124.

FIG. 5 is an explanatory view illustrating a flow of control processes of a DC/DC converter 130 executed in a grid-disconnected condition.

DESCRIPTION OF EMBODIMENTS

A. Embodiment

Figure 1:
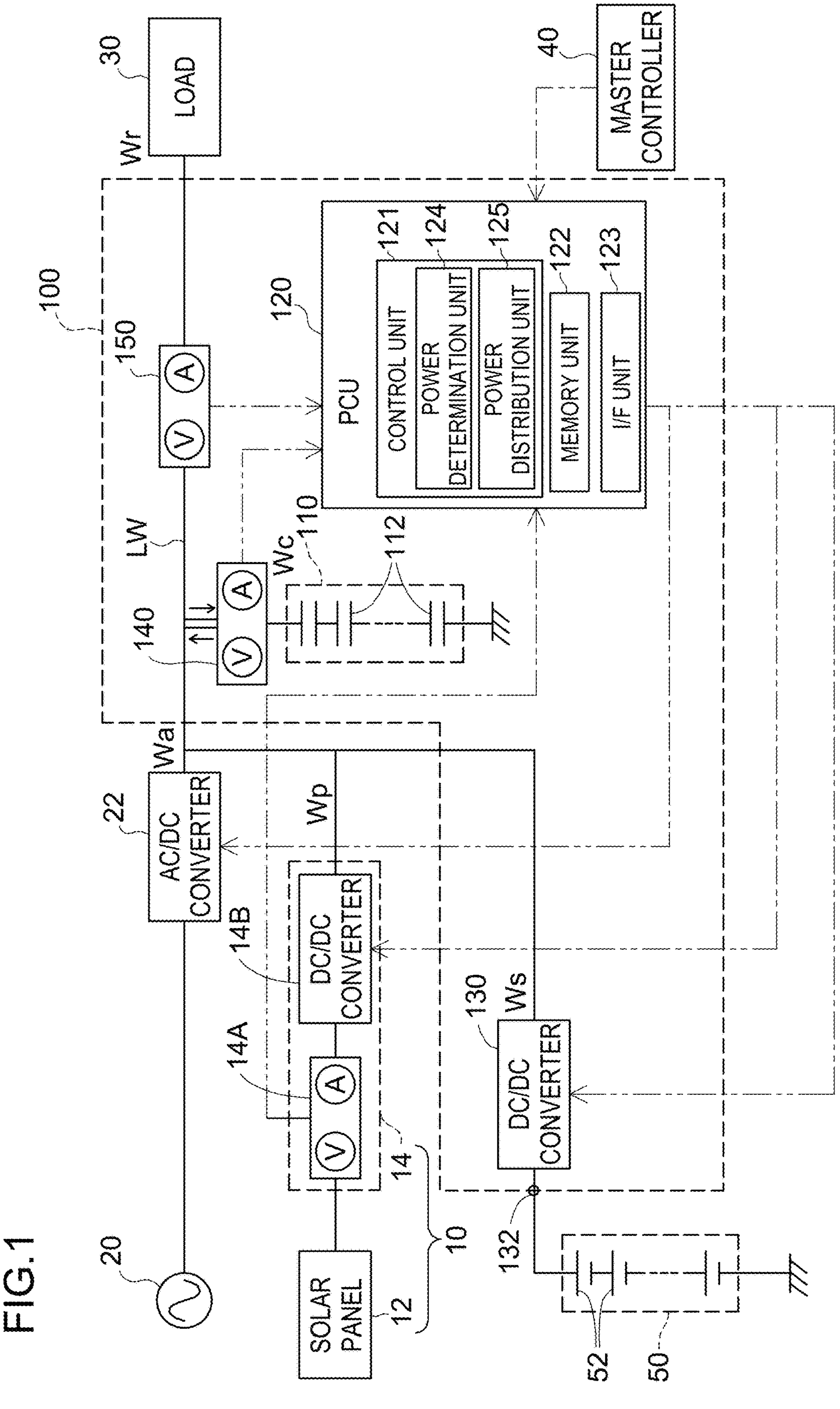
FIG. 1 is an explanatory view illustrating an electrical configuration of a power control system 100 and external devices in an embodiment.

A-1. Electrical Configuration of Power Control System 100 and External Devices:

FIG. 1 is an explanatory view illustrating an electrical configuration of a power control system 100 and an external devices in this embodiment. FIG. 1 shows a photovoltaic power generation device 10, a commercial power source (grid) 20, a load 30, a master controller 40, and an LIB module 50 as external devices, and these external devices and the power control system 100 are electrically connected via a power supply DC line LW. Examples of the load 30 may include equipment used in the manufacturing industry that performs acceleration and deceleration operations at relatively high speeds (e.g., machine tools, industrial robots, transportation equipment, textile and food processing equipment, and the like) and equipment that has relatively high power and requires operation during power outages (e.g., elevators, air conditioners and compressors, and the like).

The photovoltaic power generation device 10 generates electricity by using photovoltaics to convert solar energy into electrical power, and has solar panels 12 and a PV converter 14. The PV converter 14 includes a power generation equipment sensor 14A and a DC/DC converter 14B. The power generation equipment sensor 14A is a current-voltage sensor, which detects the voltage and current values of the power generated by the photovoltaic power generation device 10, respectively, and outputs a detection signal according to those detection results. The DC/DC converter 14B controls the solar panel 12 to maximize the power generated by the solar panel 12 based on the detection results of the power generation equipment sensor 14A, and outputs DC power corresponding to the amount of power generated by the solar panel 12 to the power supply DC line LW. The DC/DC converter 14B controls the DC power to maintain a constant voltage (e.g., a voltage with a potential higher than the power supply DC line LW). In the following, the power output from the photovoltaic power generation device 10 is referred to as "PV power Wp". In this embodiment, the PCU 120, described below, controls the on/off operation of the DC/DC converter 14B. The solar panel 12 is an example of the renewable energy-utilizing power generation device and the power supply source in the claims, and the DC/DC converter 14B is an example of the proportional charge/discharge controller in the claims.

The commercial power source 20 is electrically connected to the power supply DC line LW through an AC/DC converter 22. AC power from the commercial power source 20 is converted to DC power by the AC/DC converter 22 and output to the power supply DC line LW. In the following, the DC power output from the commercial power source 20 is referred to as "commercial power Wa". In this embodiment, the PCU 120 controls the operation of the AC/DC converter 22 so that the DC power output from the AC/DC converter 22 maintains a constant voltage (e.g., a voltage with a potential higher than the power supply DC line LW). The commercial power source 20 is an example of the power supply source in the claims, and the AC/DC converter 22 is an example of the proportional charge/discharge controller in the claims.

The power control system 100 has an LIC module 110, a PCU (power control unit) 120, a DC/DC converter 130, a capacitor sensor 140, and a load sensor 150.

The LIC module 110 consists of a plurality of lithium ion capacitors (hereinafter referred to as "LIC") 112 connected in series. One end (e.g., the positive electrode side) of the LIC module 110 is electrically connected to the load 30 via the power supply DC line LW without a voltage converter such as a DC/DC converter. In other words, in this embodiment, the potential of the one end of the LIC module 110 and the potential of the side connected to the power supply DC line LW in the load 30 are substantially identical. The other end (e.g., negative electrode side) of the LIC module 110 is electrically connected to the common line (e.g., ground line) side.

The capacitor sensor 140, which is a current-voltage sensor installed in the LIC module 110 connected in parallel to the power supply DC line LW (in other words, a current-voltage sensor installed in the current path between the LIC module 110 and the power supply DC line LW), detects the current and voltage values of the LIC module 110 during discharging and charging, respectively, and outputs a detection signal according to those detection results. The load sensor 150, which is a current-voltage sensor installed in the current path between the LIC module 110 and the load 30 in the power supply DC line LW, detects the voltage value of the load 30 and the current value flowing through the load 30, respectively, and outputs detection signals according to those detection results.

One end of the DC/DC converter 130 is electrically connected to the power supply DC line LW, and the other end of the DC/DC converter 130 is electrically connected to the connecting portion 132. One end (e.g., positive electrode side) of the LIB module 50 is electrically connected to a connecting portion 132. The other end (e.g., negative electrode side) of the LIB module 50 is electrically connected to the common line (e.g., ground line) side. The LIB module 50 is an example of the power supply source and energy storage medium in the claims, and the DC/DC converter 130 is an example of the proportional charge/discharge controller in the claims.

The LIB module 50 is an energy storage medium with a lower output density (also referred to as "power density") than the LIC module 110 above. The LIB module 50 also has a higher energy density than the LIC module 110. In this embodiment, the LIB module 50 consists of, e.g., a plurality of lithium ion batteries (hereinafter referred to as "LIB") 52 connected in series. For example, the LIB 52 is an iron phosphate-based LIB or a ternary (such as nickel-manganese-cobalt) LIB. The power stored in the LIB module 50 is hereinafter referred to as "storage power Ws".

The PCU 120 includes a control unit 121, a memory unit 122, an interface unit 123, a power determination unit 124, and a power distribution unit 125, each of which is communicatively connected to each other via a bus (not shown).

The control unit 121 is composed of a CPU or the like, and controls each proportional charge/discharge controller by executing a computer program read from the memory unit 122. Specifically, the control unit 121 controls the operation of the AC/DC converter 22, the DC/DC converter 14B of the PV converter 14, and the DC/DC converter 130. For example, the control unit 121 reads and executes a power control program (not shown) from the memory unit 122 to execute the power control process described below. When executing the power control process, the control unit 121 functions as the power determination unit 124 and the power distribution unit 125. The functions of these units will be explained in conjunction with the description of the various processes described below.

The memory unit 122 is composed of ROM, RAM, a hard disk drive (HDD), or the like, and is used to store various data, programs, and models, or as a work area or temporary storage area for data when executing various programs and models. The power control program is stored in the memory unit 122. The power control programs are computer programs for executing the power control process described below. These programs are provided as stored in a computer-readable recording medium (not shown), such as a CD-ROM, DVD-ROM, USB memory, or the like, and are stored in the memory unit 122 by installing them in the PCU 120.

The interface unit 123 is composed of a LAN interface, a USB interface, or the like, and communicates with other devices by wired or wireless means. The PCU 120 detects the current, voltage, temperature, or the like, of the LIC 112 in the LIC module 110 and the LIB 52 in the LIB module 50, and monitors the status of the LIC 112 and LIB 52 (e.g., whether or not abnormal conditions such as over-discharge, over-charge or high temperature occur) based on the detection results.

The master controller 40 is an external device communicatively connected to the power control system 100 and transmits various mode selection signals or the like to the PCU 120.

When the power control system 100 is activated, the PCU 120 executes power control processing to control the charge/discharge of the LIB module 50 while supplying power to the load 30 by using the power (the PV power Wp and the commercial power Wa) supplied from the power supply units (the photovoltaic power generation device 10 and the commercial power source 20). By controlling the charge/discharge of the LIB module 50 as described above, the charge/discharge of the LIC module 110 is indirectly controlled. Specifically, the PCU 120 executes the power control process based on the mode selection signal from the master controller 40 and various sensors 14A, 140, and 150. In this process, the PCU 120 operates the DC/DC converter 130 to control the charge/discharge of the LIB module 50 but does not directly control the charge/discharge of the LIC module 110. In other words, the PCU 120 indirectly controls the charge/discharge of the LIC module 110 by controlling the charge/discharge of the LIB module 50. In this specification, "charge/discharge" may mean both charge and discharge or only one of charge and discharge.

A-2. Power Control Mode Executed by Power Control System 100:

In the power control process, the PCU 120 selectively executes one of the multiple power control modes based on the mode selection signal from the master controller 40. The multiple power control modes include, e.g., three power control modes: "isolated operation mode", "surplus power utilizing mode", and "scheduled charge/discharge mode". FIG. 2 illustrates the charge/discharge relationship when the "isolated operation mode" and the "surplus power utilizing mode" are executed. The "LIB charge/discharge possibility" shown in FIG. 2 includes, e.g., when the charge/discharge capacity of the LIB module 50 exceeds a predetermined upper limit or when the LIB module 50 is not connected to this power control system 100. Furthermore, the charge/discharge capability has two types: output-related capability and capacity-related capability. However, this power control mode does not take into account capability with respect to output, and the disconnected state, including capacity constraints and failures, is defined as a non-chargeable/dischargeable state of the LIB module 50. Constraints related to output are considered in A-3 and beyond, described below. Although charge/discharge of the LIC module 110 is also performed when each power control mode is executed, the explanation of charge/discharge of the LIC module 110 is omitted in the following explanation of each power control mode to simplify the explanation.

A-2-1. Isolated Operation Mode

The "isolated operation mode" is a mode in which, in a grid-disconnected condition where the commercial power source 20 is disconnected from the power supply DC line LW, power is supplied to the load 30 by using the PV power Wp of the photovoltaic power generation device 10 and the power stored in the LIB module 50 (hereinafter referred to as "storage power Ws"), and the LIB module 50 is charged by using the surplus power of the power Wp (=W p−Wr).

Specifically, as shown in FIG. 2, in the isolated operation mode, when the PV power Wp of the photovoltaic power generation device 10 is greater than or equal to the power consumed by the load 30 (hereinafter referred to as "load power Wr") (Wp≥Wr), and on the condition that the LIB module 50 is in a chargeable state (denoted as "YES" in FIG. 2) the PV power Wp of the photovoltaic power generation device 10 is utilized to charge the LIB module 50 in addition to supplying power to the load 30 (Wp to Wr, Ws). In other words, the surplus power of the PV power Wp (=Wp−Wr) is utilized to charge the LIB module 50. When the LIB module 50 is in a non-chargeable state (denoted as "NO" in FIG. 2), which means that the power generation of the photovoltaic power generation device 10 is excessive, the PCU 120 outputs the power generation suppression command value Wp2 to the PV converter 14 to suppress the power generation of the photovoltaic power generation device 10. The non-chargeable state of the LIB module 50 is, e.g., the fully charged or overcharged state of the LIB module 50.

On the other hand, if the PV power Wp of the photovoltaic power generation device 10 is less than the load power Wr of the load 30 (Wp<Wr), and on the condition that the LIB module 50 is in a dischargeable state, in addition to the PV power Wp of the photovoltaic power generation device 10, the storage power Ws of the LIB module 50 is utilized to supply power to the load 30 (Wp, Ws to Wr). In other words, if the PV power Wp of the photovoltaic power generation device 10 is insufficient for the load power Wr of the load 30, the storage power Ws of the LIB module 50 is utilized to compensate for the shortage. When the LIB module 50 is in a non-dischargeable state, the PCU 120 stops supplying power to the load 30 or notifies the master controller 40 of an error due to a lack of power supply to the load 30. The non-dischargeable state of the LIB module 50 is, e.g., an over-discharge state of the LIB module 50.

A-2-2. Surplus Power Utilizing Mode

The "surplus power utilizing mode" is a mode in which power supply to the load 30 is continued even when the LIB module 50 is in a non-chargeable/dischargeable state, in a grid-connected condition in which the commercial power source 20 is connected to the power supply DC line LW.

Specifically, as shown in FIG. 2, in the surplus power utilizing mode, when the PV power Wp of the photovoltaic power generation device 10 is greater than or equal to the load power Wr of the load 30 (Wp≥Wr), and on the condition that the LIB module 50 is in a chargeable state, the PV power Wp of the photovoltaic power generation device 10 is utilized to charge the LIB module 50 in addition to supplying power to the load 30 (Wp to Wr, Ws). When the LIB module 50 is in a non-chargeable state (Ws=0), which means that the power generation of the photovoltaic power generation device 10 is excessive, the PCU 120 uses the PV power Wp of the photovoltaic power generation device 10 to supply power to the load 30 and the surplus power (=Wp−Wr) is used for the commercial power source 20 as a reverse power flow (Wp to Wr, reverse power flow). In other words, the surplus power of the photovoltaic power generation device 10 is used for so-called power sales.

On the other hand, if the PV power Wp of the photovoltaic power generation device 10 is less than the load power Wr of the load 30 (Wp<Wr), and on the condition that the LIB module 50 is in a dischargeable state, in addition to the PV power Wp of the photovoltaic power generation device 10, the storage power Ws of the LIB module 50 is utilized to supply power to the load 30 (Wp, Ws to Wr) as in isolated operation mode. When the LIB module 50 is in a non-dischargeable state (Ws=0), the commercial power Wa of the commercial power source 20 is utilized to supply power to the load 30 (Wp, Wa to Wr) in addition to the PV power Wp of the photovoltaic power generation device 10. Therefore, the power supply to the load 30 is continued even when the LIB module 50 is in a non-dischargeable state. In this way, by allowing a grid connection with the commercial power source 20, it is possible to continue to supply power to the load 30 even when the LIB module 50 is in a non-chargeable state or a non-dischargeable state.

A-2-3. Scheduled Charge/Discharge Mode

The "scheduled charge/discharge mode" is a mode in which a certain amount of power (set by the user) is systematically secured to the LIC module 110 and the LIB module 50 for charge/discharge, regardless of the status (operating or not and operating state) of the load 30.

Specifically, in the scheduled charge/discharge mode, when the mode is set to "scheduled charge", a predetermined amount of charging power (the scheduled storage charge/discharge value Ws1 described below) is supplied to the LIB module 50, regardless of the state of the load 30 or whether the photovoltaic power generation device 10 is generating power. In other words, at least one of the PV power Wp of the photovoltaic power generation device 10 and the commercial power Wa of the commercial power source 20 is utilized to charge the LIB module 50 (Wp, Wa to Ws1). In this case, if the load 30 is in operation, at least one of the surplus power of the photovoltaic power generation device 10 (Wp−Ws1) and the commercial power Wa of the commercial power source 20 is utilized to supply power to the load 30. If the PV power Wp of the photovoltaic power generation device 10 is greater than or equal to the scheduled storage charge/discharge value Ws1 (Wp≥Ws1), only the PV power Wp of the photovoltaic power generation device 10 may be used to charge the LIB module 50 without using the commercial power Wa of the commercial power source 20 (Wp to Ws1). When the photovoltaic power generation device 10 cannot generate power (Wp=0), for example at night, only the commercial power Wa of the commercial power source 20 may be utilized to charge the LIB module 50 (Wa to Ws1). The "scheduled charge" mode is executed on the assumption that the LIB module 50 is in a chargeable state.

On the other hand, in the scheduled charge/discharge mode, when the mode is set to "scheduled discharge", a predetermined amount of discharged power (the scheduled storage charge/discharge value Ws1, which is described below) is revers-flowed from the LIB module 50 to the commercial power source 20 (Ws1 to reverse power flow) regardless of the state of the load 30 or whether the photovoltaic power generation device 10 is generating power. In this case, if the load 30 is in operation, at least one of the PV power Wp of the photovoltaic power generation device 10 and the commercial power Wa of the commercial power source 20 is utilized to supply power to the load 30 (Wp, Wa to Wr). The "scheduled discharge" is executed on the assumption that the LIB module 50 is in a dischargeable state.

Figure 3:
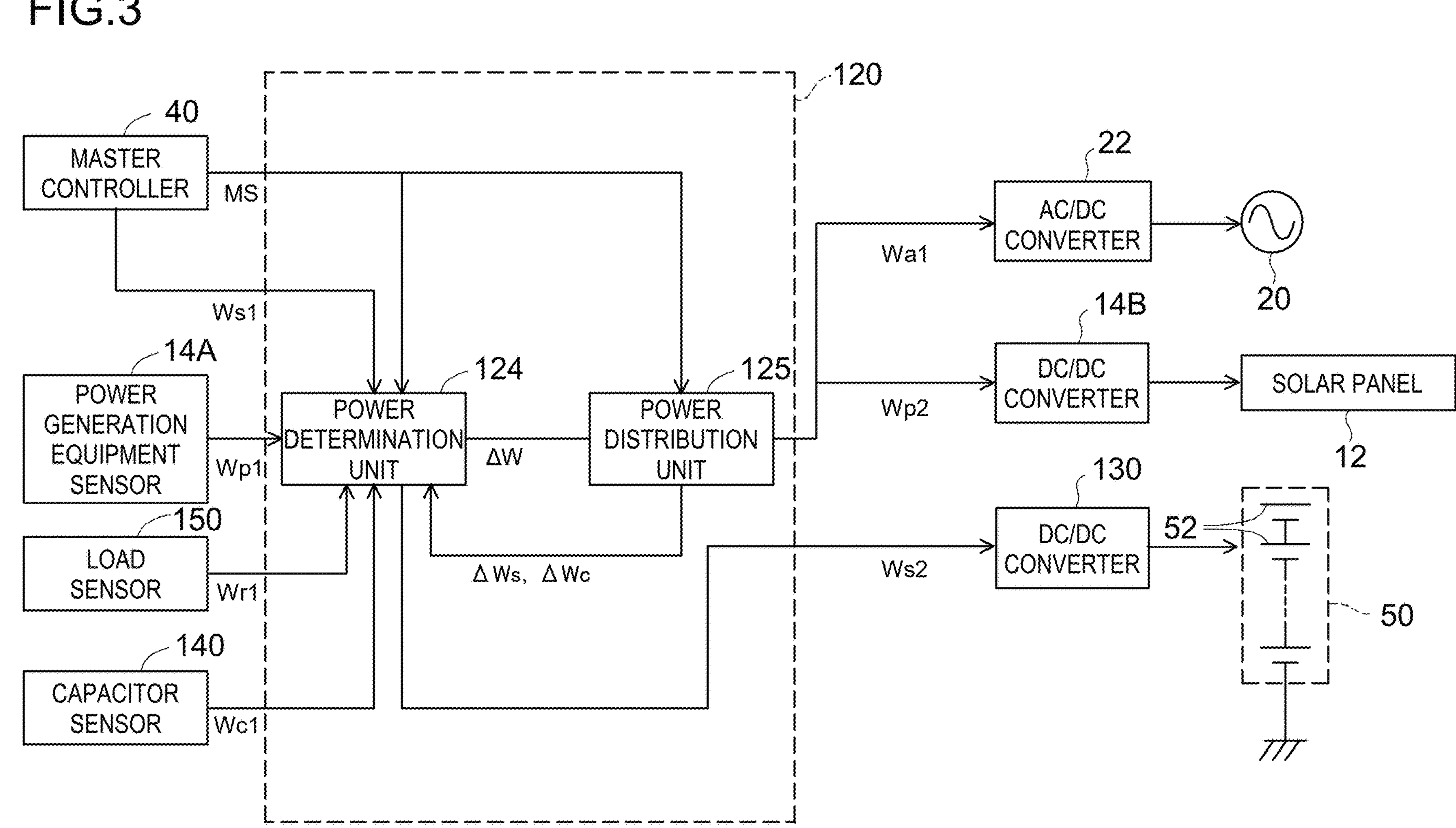
FIG. 3 is an explanatory view illustrating the functions of a control unit 121.

A-3. Power Control Process Executed by Control Unit 121 of PCU 120:

FIG. 3 is an explanatory view illustrating the functions of the control unit 121. As described above, when the power control process is executed, the control unit 121 functions as the power determination unit 124 and the power distribution unit 125 at each predetermined time interval step. The respective functions of the power determination unit 124 and the power distribution unit 125 are described below.

A-3-1. Power Determination Unit 124

FIG. 4 is an explanatory view illustrating a flow of processes executed by the power determination unit 124. The power determination unit 124 determines the excessive/deficient power value ΔW of the PV power Wp of the photovoltaic power generation device 10 relative to the scheduled power that should be secured in advance (e.g., the scheduled value of the load power Wr of the load 30, the scheduled value of the charge/discharge power to the LIB module 50, and the scheduled value of the charge/discharge power to the LIC module 110).

Specifically, as shown in FIG. 3, the power determination unit 124 determines the excessive/deficient power value ΔW based on, e.g., the following factors.

Mode Selection

Mode selection signal (MS): this is the signal used to select which of the multiple power control modes implemented in the power control system 100 is to be executed. In this embodiment, the power determination unit 124 obtains the mode selection signal MS from the master controller 40.

Various Detection Values

Power generation output value (Wp1): this is the detected value of the PV power Wp of the photovoltaic power generation device 10. In this embodiment, the power determination unit 124 identifies the power generation output value Wp1 based on the voltage and current of the solar panel 12 detected by the power generation equipment sensor 14A of the PV converter 14.

Load sensor output value (Wr1): this is the detected value of the load power Wr of the load 30. In this embodiment, the power determination unit 124 identifies the load sensor output value Wr1 based on the voltage and current of the load 30 detected by the load sensor 150.

Capacitor sensor output value (Wc1): this is the detected value of the charge/discharge power Wc of the LIC module 110. In this embodiment, the power determination unit 124 identifies the capacitor sensor output value Wc1 based on the voltage and current of the LIC module 110 detected by the capacitor sensor 140.

Various Scheduled Values

Scheduled storage charge/discharge value (Ws1): this is the scheduled value of the charge/discharge power of the LIB module 50 set in the above scheduled charge/discharge mode. In this embodiment, the power determination unit 124 obtains the scheduled storage charge/discharge value Ws1 from the master controller 40.

Scheduled capacitor charge/discharge value (Wc2): this is the scheduled value of the charge/discharge power Wc of the LIC module 110. In this embodiment, as described above, the potential of one end of the LIC module 110 and the potential of the side connected to the power supply DC line LW in the load 30 are substantially identical. Therefore, the scheduled capacitor charge/discharge value Wc2 means the scheduled value of the charge/discharge power of the LIC module 110 required to maintain a predetermined potential difference with the load 30 (in this embodiment, the potential difference is approximately zero). As described below, the power determination unit 124 identifies the scheduled capacitor charge/discharge value Wc2 based on the capacitor sensor output value Wc1.

Various Excessive/Deficient Values

Storage charge/discharge excessive/deficient value (ΔWs): this is the value of excessive/deficient actual charge/discharge power of the LIB module 50 relative to the scheduled storage charge/discharge value Ws1 in the previous step of the power control process. The power determination unit 124 obtains the storage charge/discharge excessive/deficient value ΔWs from the power distribution unit 125. In the example in FIG. 4, the value of the charging power of the LIB module 50 is a "positive value", and the value of the discharging power of the LIB module 50 is a "negative value".

Capacitor charge/discharge excessive/deficient value (ΔWc): this is the value of the excessive/deficient actual charge/discharge power of the LIC module 110 relative to the scheduled capacitor charge/discharge value Wc2 in the previous step of the power control process. The power determination unit 124 obtains the capacitor charge/discharge excessive/deficient value ΔWc from the power distribution unit 125. In the example in FIG. 4, the value of the charging power of the LIC module 110 is a "positive value", and the value of the discharging power of the LIC module 110 is a "negative value".

The power determination unit 124 determines the excessive/deficient power value ΔW based on the power generation output value Wp1, the load sensor output value Wr1, the scheduled storage charge/discharge value Ws1, and the capacitor sensor output value Wc1. Specifically, as shown in FIG. 4, the power determination unit 124 subtracts the load sensor output value Wr1, as well as the scheduled storage charge/discharge value Ws1 and the scheduled capacitor charge/discharge value Wc2, from the power generation output value Wp1 in advance to determine the excessive/deficient power value ΔW (=Wp1−Wr1−Ws1−Wc2). This ensures that the power required for the power control system 100 and the surplus power (the scheduled storage charge/discharge value Ws1 and the scheduled capacitor charge/discharge value Wc2) are secured for the power generation output value Wp1 and the load sensor output value Wr1, which fluctuate relatively widely.

Here, the LIC module 110, having a relatively high output density, is mainly utilized to charge and discharge the short-period component of the excessive/deficient power value ΔW, and the LIB module 50, having a relatively low output density, is mainly utilized to charge and discharge the long-period component of the excessive/deficient power value ΔW. Therefore, it is desirable that the integrated value of charge/discharge power of the LIC module 110 should be zero in total in the long run. However, in practice, due to the power state of the load 30, for example, the long-term state of the LIC module 110 may be biased toward the charging state or discharging state, and the integrated value of the charge/discharge power of the LIC module 110 may not reach zero.

Therefore, in this embodiment, the power determination unit 124 is provided with a capacitor voltage correction unit 127. The capacitor voltage correction unit 127 determines the scheduled capacitor charge/discharge value Wc2 based on the capacitor sensor output value Wc1 so that the integrated value of the charge/discharge power of the LIC module 110 in a predetermined period becomes zero in total. Specifically, the capacitor voltage correction unit 127 calculates the integrated value of the charge/discharge power of the LIC module 110 in the predetermined period based on the capacitor sensor output value Wc1, and the scheduled capacitor charge/discharge value Wc2 is determined as the charge/discharge power value to compensate the integrated value.

In addition, the capacitor voltage correction unit 127 corrects the voltage of the LIC module 110. Specifically, the fluctuation range of the voltage of the LIC module 110 (the voltage of the load 30 and the voltage of the power supply DC line LW) will shift due to the bias of the long-term state of the LIC module 110 toward the charging state or the discharging state. As a result, the voltage of the LIC module 110 may fall outside the operable range of the load 30, or the estimated capacitor charge/discharge value Wc3 (=Wc1+ΔWc) may exceed the maximum charge/discharge power capacity of the LIC module 110 or the maximum energy storage capacity of the LIC module 110. Therefore, the control unit 121 uses the power from the LIB module 50 or the commercial power source 20 or gradually shifts the voltage of the LIC module 110 by stopping the power generation while considering the above scheduled capacitor charge/discharge value Wc2 to ensure that the voltage of the LIC module 110 is within the operable range of the load 30, and the estimated capacitor charge/discharge value Wc3 is equal to or less than the maximum charge/discharge power capacity of the LIC module 110 and the maximum energy storage capacity of the LIC module 110. If these measures are not possible, the power control system 100 is shut down. For example, the voltage of the LIC module 110 is adjusted so that the range of fluctuation of the voltage of the LIC module 110 is within the operable range of the load 30. Specifically, the voltage of the LIC module 110 is adjusted so that the center voltage value of the voltage of the LIC module 110 approaches the center voltage value of the operable range of the load 30. The voltage of the power supply DC line LW (voltage of the LIC module 110) is adjusted by controlling the DC/DC converter 130 or the AC/DC converter 22.

The power determination unit 124 calculates the storage charge/discharge command value Ws2 (=Ws1+ΔWs) by adding the storage charge/discharge excessive/deficient value ΔWs to the scheduled storage charge/discharge value Ws1. In other words, the storage charge/discharge command value Ws2 is the scheduled value of the charge/discharge power of the LIB module 50 required in the current step, taking into account the storage charge/discharge excessive/deficient value ΔWs in the previous step. The PCU 120 controls the operation of the DC/DC converter 130 based on the calculated storage charge/discharge command value Ws2 (see FIG. 3). As a result, the charge/discharge of the LIB module 50 is controlled so that the charge/discharge power of the LIB module 50 becomes the scheduled storage charge/discharge value Ws1.

A-4. Configuration for Effective Use of Solar Energy:

The power distribution unit 125 can effectively utilize solar energy (the PV power Wp of the photovoltaic power generation device 10) by the following control.

A-2-1: Suppression of Excessive/Deficient Power of PV Power Wp Relative to Load Power Wr When the scheduled storage charge/discharge value Ws1 and the scheduled capacitor charge/discharge value Wc2 are set to zero for the excessive/deficient power value ΔW (=Wp1−Wr1−Ws1−Wc2), the excessive/deficient power value ΔW becomes ΔW (Wp1−Wr1). Therefore, the excessive/deficient power value ΔW will be supplied from the commercial power Wa of the commercial power source 20 and the storage power Ws of the LIB module 50.

The power control system 100 (PCU 120) changes the target output value Wpt of the PV power Wp of the photovoltaic power generation device 10 according to the conditions of the load 30. The control unit 121 of the PCU 120 obtains the target output value of the PV power Wp by the following equation 1.

$$Wpt = (Wr * k) - \Delta D \qquad \text{[Equation 1]}$$

k: ratio of maximum power generation to power consumption

ΔD: power width for instantaneous fluctuation

The coefficient k is set close to "1", and the power width ΔD of instantaneous fluctuation is set close to "0 (zero)". In this case, if the target output value Wpt is large, the PV power Wp can be effectively utilized, but the risk of reverse power flow increases, which is a trade-off relationship. In this embodiment, by adjusting the balance between the two, the PV power Wp can be effectively utilized while reducing the risk of reverse power flow.

Therefore, in this embodiment, the LIC module 110 is connected to the power supply DC line LW so that the DC-converted potential difference with the load 30 does not fluctuate (see FIG. 1), as described above. The capacitance of the LIC module 110 is large enough to keep the "power width of instantaneous fluctuations" close to zero. In other words, the fluctuation amount ΔJ of the load power Wr can be expressed by the following equation 2.

$$\Delta J = C * \left[\left(Vdc^2 \pm \Delta V^2\right)/2\right] \qquad \text{[Equation 2]}$$

C: capacity of the power supply DC line LW

Vdc: reference voltage of the power supply DC line LW

ΔV: voltage fluctuation amount of the power supply DC line LW

The larger the capacity C of the power supply DC line LW, the smaller the voltage fluctuation amount ΔV of the power supply DC line LW of instantaneous fluctuations. The power width ΔD for instantaneous fluctuations in Equation 1 and the voltage fluctuation amount ΔV of the power supply line LW for instantaneous fluctuations in Equation 2 can be treated equivalently when the "instantaneous" represents a sampling time that is difficult to follow for DC voltage control. Therefore, by setting the capacitance of the LIC module 110 to a capacitance large enough to bring the voltage fluctuation amount ΔV of the instantaneous fluctuations of the power supply line LW to "0", the power width ΔD can be brought close to "0", resulting in effective utilization of the PV power Wp.

A-2-2: Suppression of Mutual Interference in DC Voltage Feedback Control of Proportional Charge/Discharge Controllers The power control system 100 has a configuration for suppressing mutual interference of DC voltage feedback control of proportional charge/discharge controllers. As described above, in this embodiment, the proportional charge/discharge controllers are an AC/DC converter 22 connected to the commercial power source 20, the DC/DC converter 14B connected to the solar panel 12, and the DC/DC converter 130 connected to the LIB module 50 (see FIGS. 1 and 3). These plurality of proportional charge/discharge controllers (22, 14B, 130) are controlled by the control unit 121.

Here, if the control unit 121 were to perform DC voltage feedback control for the plurality of proportional charge/discharge controllers individually, there would be a risk of mutual interference due to deviations in control timing and control quantity. If mutual interference in DC voltage feedback control occurs, for example, power generation by the photovoltaic power generation device 10 may stop due to unexpected fluctuations in the voltage of the power supply DC line LW, making it impossible to effectively utilize solar energy. In other words, the cessation of power generation by the photovoltaic power generation device 10 makes it impossible to convert solar energy into electric power and utilize it.

With respect to this, the inventors, after careful consideration, have newly found a configuration in which the LIC module 110 is connected to the power supply DC line LW so that the DC-converted potential difference with the load 30 does not fluctuate, and DC voltage feedback control is performed for only one specific controller among a plurality of proportional charge/discharge controllers (see FIG. 1). This configuration makes it possible to control the plurality of proportional charge/discharge controllers while suppressing the occurrence of mutual interference in DC voltage feedback control.

In other words, because the LIC module 110 is connected to the power supply DC line LW in such a way that the DC-converted potential difference with the load 30 does not fluctuate, the temporal change (response, amplitude) of the voltage of the power supply DC line LW is reduced according to the capacity of the LIC module 110. For example, the voltage of the power supply DC line LW fluctuates slowly in response to sudden changes in the voltage of the load 30. Therefore, the effect of the voltage fluctuation in the power supply DC line LW on the control for other proportional charge/discharge controllers can be suppressed despite the use of a configuration in which DC voltage feedback control is performed only for a specific controller. Moreover, in this embodiment, as described above, the capacitance of the LIC module 110 is set to a capacitance large enough to bring the voltage fluctuation amount ΔV of the power supply line LW for instantaneous fluctuations close to "0". Therefore, with respect to the load power Wr fluctuation (ΔJ), the response of the voltage fluctuation (ΔV) of the power supply DC line LW slows down more reliably and the voltage fluctuation amount of the power supply DC line LW (ΔV) becomes smaller more reliably. This allows more effective suppression of the effects of voltage fluctuations in the power supply DC line LW on the control of other proportional charge/discharge controllers.

The PCU 120 performs current feedback control to bring the output current value closer to the target current value based on the storage power Ws and the power generation output value Wp1 for the other proportional charge/discharge controllers, excluding the specific controller, among the plurality of proportional charge/discharge controllers. The PCU 120 may also perform power feedback control for at least one of the other proportional charge/discharge controllers to bring the output power value closer to the target power value based on the storage power Ws and the power generation output value Wp1. By performing such control, the power supply source connected to the other proportional charge/discharge controllers can be treated as a negative load (part of the load).

A-2-3. Effective Utilization of Solar Energy in Grid-Disconnected Condition

In grid-disconnected conditions, for example, the isolated operation mode is executed. In grid-disconnected conditions, the voltage of the power supply DC line LW may increase due to the surplus power of the PV power Wp (=Wp−Wr). An increase in the voltage of the power supply DC line LW may cause the load 30 to be shut down by the safety function protecting the load 30 or may cause a power failure in the facility where the load 30 is located. If this happens, the PV power Wp of the photovoltaic power generation device 10 cannot be effectively utilized to supply power to the load 30. In addition, when the PV power Wp is less than the load power Wr, the storage power Ws of the LIB module 50 is released to provide power to the load 30 instead of the power that should have been obtained from the power generation of the photovoltaic power generation device 10.

In contrast, as described above, in this embodiment, the surplus power of the PV power Wp is suppressed so that the operation of the load 30 continues, and the PV power Wp of the photovoltaic power generation device 10 can be effectively utilized to supply power to the load 30. In the grid-disconnected condition, the control unit 121 performs DC voltage feedback control only for the DC/DC converter 130 connected to the LIB module 50. The control unit 121 performs current feedback control or power feedback control for the DC/DC converter 14B to which the solar panel 12 is connected. This allows the DC/DC converter 14B and the DC/DC converter 130 to be controlled while suppressing the occurrence of mutual interference in DC voltage feedback control in the grid-disconnected condition. In addition, solar energy can be effectively utilized by freely controlling the power generation of the solar panel 12 without being restricted by DC voltage feedback control.

A-2-4. Effective Utilization of PV Energy During Self-Consumption in Grid-Connected Condition In grid-connected conditions, the surplus power (=Wp−Wr) of the PV power Wp revers-flows to the commercial power source 20. For example, in a case where a self-consumption contract is entered into so as not to sell power to a power company, when a reverse power flow occurs, the power generation operation of the photovoltaic power generation device 10 is temporarily stopped based on a signal from a reverse power flow detector (not shown) installed in the power receiving facility. In this case, solar energy cannot be converted into electric power and utilized. In addition, when the PV power Wp is less than the load power Wr, the power that should have been obtained from the power generation of the photovoltaic power generation device 10 is unnecessarily purchased from the commercial power source 20.

In contrast, as described above, in this embodiment, since the surplus PV power Wp is suppressed, the occurrence of reverse power flow is suppressed, so that the power generation operation of the photovoltaic power generation device 10 continues and the PV power Wp of the photovoltaic power generation device 10 can be effectively utilized to supply power to the load 30. In the grid-connected condition, the control unit 121 performs DC voltage feedback control for the AC/DC converter 22 connected to the commercial power source 20. In addition, the control unit 121 restricts the grid output to prevent reverse power flow from occurring. The control unit 121 performs current feedback control or power feedback control for the DC/DC converter 14B connected to the solar panel 12 and the DC/DC converter 130 connected to the LIB module 50. This allows the AC/DC converter 22, the DC/DC converter 14B, and the DC/DC converter 130 to be controlled while suppressing the occurrence of mutual interference in DC voltage feedback control in the grid-connected condition. In addition, solar energy can be effectively utilized by freely controlling the power generation of the solar panel 12 without being restricted by the DC voltage feedback control. In addition, by performing current feedback control for the DC/DC converter 130 to which the LIB module 50 is connected, the LIB module 50 can be treated as a negative load equivalent (part of the load). For example, by becoming part of the load, the LIB module 50 can charge and discharge as scheduled in advance without being restricted by the DC voltage feedback control.

A-2-5. Suppression of Instantaneous Fluctuations in Voltage of Power Supply DC Line LW Due to Disturbances The control unit 121 combines DC voltage feedback control with feedforward control based on a predicted excessive/deficient power of the load power Wr relative to the power supplied from a plurality of power supply sources to control the specific controller.

In the following, an example of a grid-disconnected condition will be described. In the grid-disconnected condition, the specific controller is the DC/DC converter 130 connected to the LIB module 50. FIG. 5 is an explanatory view illustrating the flow of the control process of the DC/DC converter 130 executed in a grid-disconnected condition. As shown in FIG. 5, the control unit 121 includes a feedback control unit 210 and a feedforward control unit 220. The feedback control unit 210 outputs a first current command D1 that brings the load voltage Vf (voltage value of the power supply DC line LW) detected by the load sensor 150 closer to a predetermined target voltage value Vt. The feedforward control unit 220 outputs a second current command D2 according to the excessive/deficient power. This excessive/deficient power is the excessive/deficient power consumed by the load 30 relative to the power supplied from a plurality of power supply sources (the commercial power source 20, the solar panel 12, and the LIB module 50). This excessive/deficient power can be the above excessive/deficient power value ΔW (=Wp1−Wr1−Ws1−Wc2, the predicted value of excessive/deficient power) determined by the power distribution unit 125 or an actual measured value based on detection signals from each sensor. The feedforward control unit 220 can perform feedforward control by selecting the above excessive/deficient power value ΔW and the actual measured value of excessive/deficient power.

The current command Di, which is the sum of the first current command D1 and the second current command D2, is provided to the DC/DC converter 130. In other words, the DC/DC converter 130 is provided with a current command Di that is modified according to the excessive/deficient power as a disturbance. This improves robustness and suppresses instantaneous fluctuations in the voltage of the power supply DC line LW due to the disturbance, so that the operation of the load 30 continues, and the PV power Wp of the photovoltaic power generation device 10 can be effectively utilized to supply power to the load 30.

It should be noted that selecting the excessive/deficient power value ΔW by the feedforward control unit 220 has the following advantages. That is, the power determination unit 124 subtracts the load sensor output value Wr1, as well as the scheduled storage charge/discharge value Ws1 and the scheduled capacitor charge/discharge value Wc2, from the power generation output value Wp1 in advance to determine the excessive/deficient power value ΔW (=Wp1−Wr1−Ws1−Wc2) (see FIG. 4). In other words, not only the load power Wr but also the scheduled charge/discharge power of the LIB module 50 and the scheduled charge/discharge power of the LIC module 110, which are determined in advance, are previously secured. This means that, according to this embodiment, compared to a configuration in which, e.g., the excessive/deficient power of the PV power Wp with respect to load power Wr(=Wp1−Wr1) is distributed to the LIB module 50 and the LIC module 110 in a subsequent step, the scheduled charge/discharge power of the LIB module 50 and the scheduled charge/discharge power of the LIC module 110 can be more reliably secured. In addition, according to this embodiment, the excessive/deficient power (excessive/deficient power value ΔW) that is not used for those scheduled power can be accurately identified. This makes it possible to effectively utilize surplus power without wasting it or to compensate for power shortages by distributing power by, e.g., the power distribution unit 125.

B. Modifications

The present invention is not limited to the embodiment described above but can be modified into various forms to the extent that it does not depart from the gist thereof, for example, the following modifications are possible.

The configuration of the power control system 100 and the like in the above embodiment is only an example and can be modified in various ways. For example, in the above embodiment, the power supply source is exemplified as the photovoltaic power generation device 10, the commercial power source 20, and the LIB module 50; however, the power supply source may also be a renewable energy-utilizing power generation device that generates power by using renewable energy sources other than sunlight (e.g., wind, hydroelectric, geothermal, thermal natural energy, or the like). The power supply source may also be a power generation device that does not use renewable energy, such as a gas generator, e.g., or a power supply source other than the commercial power source 20 or the LIB module 50.

In the above embodiment, the power supply DC line LW may not be connected to the LIB module 50 (the DC/DC converter 130). The power control system 100 may also be configured to incorporate at least one of the AC/DC converter 22, the DC/DC converter 14B, and the DC/DC converter 130. A plurality of power control systems 100 may be connected in series or in parallel. Since the multiple devices (the LIC module 110, the DC/DC converter 130, or the like) constituting the power control system 100 are connected to a common power supply DC line LW, these multiple devices are connected in parallel with each other. However, when multiple units of this power control system 100 are connected, there may be devices connected in series.

In the above embodiment, the AC/DC converter 22, the DC/DC converter 14B, and the DC/DC converter 130 are illustrated as examples of proportional charge/discharge controllers; however, any proportional charge/discharge controller in which the input is proportional to the output, such as a proportional charge/discharge controller formed by combining an AC/DC converter and a DC/DC converter, may be used. The proportional charge/discharge controllers are not limited to controllers that control both charge and discharge but also include controllers that control only one of charge and discharge.

In the above embodiment, the LIC module 110 may be configured with a plurality of LICs 112 connected in parallel, a plurality of LICs 112 connected in series and parallel, or with only one LIC 112. In the above embodiment, the LIC module 110 (LIC 112) is exemplified as a capacitor, but it may be, e.g., an electric double layer capacitor (EDLC) or an electrolytic capacitor.

In the above embodiment, the LIB module 50 may be configured with a plurality of LIBs 52 connected in parallel, a plurality of LIBs 52 connected in series and parallel, or with only one LIB 52. In the above embodiment, the LIB module 50 (the LIB 52) is illustrated as the energy storage medium, but other types of energy storage devices, such as lead-acid batteries may be used. The energy storage medium is not limited to an energy storage device that stores electric power but may also be a device such as a hydrogen storage device that stores energy other than electric power and converts that energy into electric power for output.

In the above embodiment, the potential of the one end of the LIC module 110 and the potential of the side connected to the power supply DC line LW in the load 30 are substantially identical; however, the potential of the one end of the LIC module 110 and the potential of the side connected to the power supply DC line LW in the load 30 may be different, and the difference between the two potentials may be unchanged. Even in this configuration, the LIC module 110 has a higher voltage-to-capacitance correlation than the LIB module 50, so the charge/discharge of the LIC module 110 can be controlled indirectly by controlling the charge/discharge of the LIB module 50 without providing a dedicated DC/DC converter.

The contents of the various processes in the above embodiment are only an example and can be modified in various ways. In the above embodiment, the PCU 120 is configured to selectively execute one of the three power control modes of "isolated operation mode", "surplus power utilizing mode", and "scheduled charge/discharge mode" in the power control process; however, the configuration is not limited to this, and only one or two of the three power control modes may be executed, or modes other than these three power control modes may be executed. In the above embodiment, the power control system 100 may also be configured without the master controller 40, and the PCU 120 may select and execute the power control modes by itself.

In the power control process of the above embodiment, the power determination unit 124 may determine the excessive/deficient power value ΔW by subtracting the load sensor output value Wr1 and only one of the scheduled storage charge/discharge value Ws1 or scheduled capacitor charge/discharge value Wc2 from the power generation output value Wp1 in advance. Furthermore, in the above embodiment, the control unit 121 of the PCU 120 may not function as the power determination unit 124, but instead may supply power to the load 30 by using the PV power Wp and the commercial power Wa as in the conventional power control process, and the configuration may perform charge/discharge of the LIB module 50 and the LIC module 110 according to the resulting excessive/deficient power. The control unit 121 may also control the charge/discharge of the LIC module 110 independently of the charge/discharge of the LIB module 50 based on the detected voltage of the load 30 (the load sensor output value Wr1).

In the above embodiment, the distribution target of the power distribution unit 125 is the excessive/deficient power value ΔW (=Wp1−Wr1−Ws1−Wc2), but it may also be the power generation output value Wp1 (which may include the commercial power Wa) or the excessive/deficient power of the PV power Wp relative to the load power Wr(=Wp1−Wr1). The control unit 121 may be configured not to perform at least one of the processes by the power determination unit 124 and the power distribution unit 125.

Figure 6:
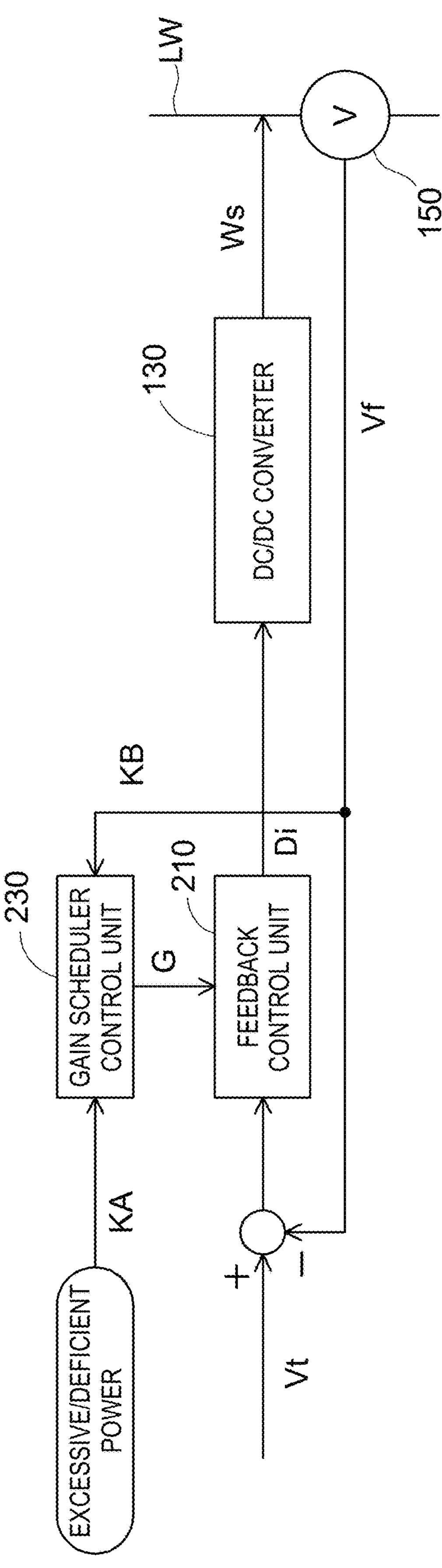
FIG. 6 is an explanatory view illustrating a flow of control processes of the DC/DC converter 130 executed in a grid-disconnected condition in a modification.

FIG. 6 is an explanatory view illustrating a flow of the control processes of the DC/DC converter 130 executed in a grid-disconnected condition in a modification. As shown in FIG. 6, the control unit 121 includes a feedback control unit 210 and a gain scheduler control unit 230. The gain scheduler control unit 230 performs gain scheduler (gain scheduling) control based on the excessive/deficient power (the excessive/deficient power value ΔW or an actual measured value of excessive/deficient power) and the voltage of the power supply DC line LW. Specifically, the gain scheduler control unit 230 obtains the excessive/deficient power as the scheduling variable KA and the voltage value Vf of the power supply DC line LW as the scheduling variable KB. The gain scheduler control unit 230 refers to the gain map prepared in advance, extracts the gain command G according to the acquired scheduling variable KA and variable KB, and supplies it to the feedback control unit 210. The feedback control unit 210 changes the gain in feedback control based on the supplied gain command G. As a result, a current command Di based on the gain modified according to the excessive/deficient power and the voltage fluctuation of the power supply DC line LW is supplied to the DC/DC converter 130. As a result, the deviation of the voltage value Vf of the power supply DC line LW from the target voltage value Vt becomes smaller. This improves robustness and suppresses instantaneous fluctuations in the voltage of the power supply DC line LW due to disturbances, so that the operation of the load 30 continues, and the PV power Wp of the photovoltaic power generation device 10 can be effectively utilized to supply power to the load 30. The gain scheduler control unit 230 may be configured to obtain only one of the scheduling variables KA and KB.

In the above embodiment, a part of the configuration implemented by hardware may be replaced with software, or conversely, a part of the configuration implemented by software may be replaced with hardware.

REFERENCE SIGNS LIST

10: photovoltaic power generation device, 12: solar panel, 14: PV converter, 14*a*: power generation equipment sensor, 14B: DC/DC converter, 20: commercial power source, 22: AC/DC converter, 30: load, 40: master controller, 50: LIB module, 52: LIB, 100: power control system, 110: LIC module, 112: LIC, 120: PCU, 121: control unit, 122: memory unit, 123: interface unit, 124: power determination unit, 125: power distribution unit, 127: capacitor voltage correction unit, 130: DC/DC converter, 132: connecting portion, 140: capacitor sensor, 150: load sensor, 210: feedback control unit, 220: feedforward control unit, 230: gain scheduler control unit, LW: power supply DC line

The invention claimed is:

1. A power control system connected to a power supply DC line to which a plurality of power converters and a load are connected, each of the plurality of power converters being connected to a respective power source of a plurality of power supply sources, the power control system comprising:

- a capacitor electrically connected to the power supply DC line;
- a capacitor sensor, provided in the current path between the capacitor and the power supply DC line, which detects the charge and discharge values of the capacitor; and
- a control unit comprising a processor that executes computer executable instructions to control the plurality of power converters and performs DC voltage feedback control to bring the voltage of the power supply DC line closer to a target voltage for only one specific power converter of the plurality of power converters, wherein

- the control unit provides the specific power converter with a current command that is the sum of a first current command based on DC voltage feedback control and a second current command based on feedforward control using a predicted excessive/deficient power consumption of the load relative to the power supplied from the plurality of power supply sources, the plurality of power converters includes at least a first power converter connected to a renewable energy utilization power generation device serving as the respective power supply source thereof and at least a second power converter connected to an energy storage medium serving as the respective power supply source thereof, and the predicted excessive/deficient power consumption of the load is further based on a scheduled value of power to be charged/discharged by the capacitor required to maintain a predetermined potential difference with the load.

2. The power control system according to claim 1, wherein the specific power converter is selected from one of the plurality of power converters other than the first power converter.

3. The power control system according to claim 2, wherein the plurality of power supply sources includes a commercial power source, the plurality of power converters includes a third power converter connected to the commercial power source as the respective power supply source, and in a grid-disconnected condition where the commercial power source is disconnected from the power supply DC line, the specific power converter is selected as the second power converter.

4. The power control system according to claim 2, wherein the plurality of power supply sources includes a commercial power source, the plurality of power converters includes a third power converter connected to the commercial power source as the respective power supply source, and in a grid-connected condition where the commercial power source is connected to the power supply DC line, the specific power converter is selected as the third power converter.

5. The power control system according to claim 1, wherein the control unit provides a gain command based on gain schedule control for the DC voltage feedback control, based on a predicted excessive/deficient power consumption of the load relative to the power supplied from the plurality of power supply sources, and the DC voltage feedback control changes a gain in the DC voltage feedback control based on the gain command.

6. A power control system connected to a power supply DC line to which a plurality of power converters and a load are connected, each of the plurality of power converters being connected to a respective power source of a plurality of power supply sources, the power control system comprising:

a capacitor electrically connected to the power supply DC line;

a capacitor sensor, provided in the current path between the capacitor and the power supply DC line, which detects the charge and discharge values of the capacitor; and a control unit that controls the plurality of power converters and performs DC voltage feedback control to bring the voltage of the power supply DC line closer to a target voltage for only one specific power converter of the plurality of power converters, wherein the plurality of power converters includes at least a first power converter connected to a renewable energy utilization power generation device serving as the respective power supply source thereof and at least a second power converter connected to an energy storage medium serving as the respective power supply source thereof, the control unit provides a gain command based on a gain scheduler control for the DC voltage feedback control, based on a predicted excessive/deficient power consumption of the load relative to the power supplied from the plurality of power supply sources, and the DC voltage feedback control changes a gain in the feedback control based on the gain command.

7. The power control system according to claim 6, wherein the specific power converter is selected from one of the plurality of power converters other than the first power converter.

8. The power control system according to claim 7, wherein the plurality of power supply sources includes a commercial power source, the plurality of power converters includes a third power converter connected to the commercial power source as the respective power supply source, and in a grid-disconnected condition where the commercial power source is disconnected from the power supply DC line, the specific power converter is selected as the second power converter.

9. The power control system according to claim 7, wherein the plurality of power supply sources includes a commercial power source, the plurality of power converters includes a third power converter connected to the commercial power source as the respective power supply source, and in a grid-connected condition where the commercial power source is connected to the power supply DC line, the specific power converter is selected as the third power converter.

* * * * *